(12) United States Patent
Wang et al.

(10) Patent No.: US 11,673,263 B2
(45) Date of Patent: Jun. 13, 2023

(54) SELF-LEARNING INTELLIGENT DRIVING DEVICE

(71) Applicant: National Taiwan Normal University, Taipei (TW)

(72) Inventors: Wei-Yen Wang, Taipei (TW); Chen-Chien Hsu, Taipei (TW); Yi-Hsing Chien, Taipei (TW); Min-Jie Hsu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 486 days.

(21) Appl. No.: 17/039,148

(22) Filed: Sep. 30, 2020

(65) Prior Publication Data

US 2022/0055211 A1    Feb. 24, 2022

(30) Foreign Application Priority Data

Aug. 19, 2020   (TW) .................................. 109128323

(51) Int. Cl.
| | |
|---|---|
| *G06F 17/00* | (2019.01) |
| *B25J 9/16* | (2006.01) |
| *G05B 13/02* | (2006.01) |
| *G06N 3/045* | (2023.01) |

(52) U.S. Cl.
CPC ............ *B25J 9/163* (2013.01); *G05B 13/027* (2013.01); *G06N 3/045* (2023.01)

(58) Field of Classification Search
CPC ................. B25J 9/163; G05B 13/027; G05B 2219/39298; G06N 3/045; G06N 3/044; G06N 3/082; G06N 3/006; G06N 3/088

USPC .......................................................... 700/250
See application file for complete search history.

(56) References Cited

U.S. PATENT DOCUMENTS

| | | | | |
|---|---|---|---|---|
| 11,443,337 | B2* | 9/2022 | Bronicki | G06T 7/50 |
| 11,474,519 | B2* | 10/2022 | Hicok | G05D 1/0055 |
| 11,507,105 | B2* | 11/2022 | Maunder | B25J 9/161 |
| 11,547,369 | B2* | 1/2023 | Villongco | G06F 18/23213 |
| 11,561,251 | B2* | 1/2023 | Schwartz | G06N 3/08 |
| 11,562,031 | B2* | 1/2023 | Kam | G06F 16/909 |

(Continued)

OTHER PUBLICATIONS

A neural network based approach for trajectory planning (Year: 2016).*

(Continued)

*Primary Examiner* — Ronnie M Mancho
(74) *Attorney, Agent, or Firm* — Guice Patents PLLC (57) ABSTRACT

A self-learning intelligent driving device including: a first neural network module for performing a corresponding action evaluation operation on an input image to generate at least one set of trajectory coordinates: a switching unit controlled by a switching signal, where when the switching signal is active, data received at a first port is sent to a second port, and when the switching signal is inactive, data received at the first port is sent to a third port; a second neural network module for performing a corresponding image evaluation operation on the at least one set of trajectory coordinates when the switching signal is active to generate at least one simulated trajectory image; and a driving unit having a robotic arm for generating at least one corresponding motion trajectory according to the at least one set of trajectory coordinates when the switching signal is inactive.

5 Claims, 11 Drawing Sheets

(56) References Cited

U.S. PATENT DOCUMENTS

| | | |
|---|---|---|
| 11,564,641 B2 * | 1/2023 | Villongco .............. A61B 34/10 |
| 11,599,744 B2 * | 3/2023 | Sharma ................ G06V 10/774 |
| 2022/0261593 A1 * | 8/2022 | Yu .......................... G06N 3/088 |

OTHER PUBLICATIONS

A Novel Hybrid Path Planning Method Based on Q-Learning and Neural Network for Robot Arm (Year: 2021).*

Trajectory Planning and Simulation Study of Redundant Robotic Arm for Upper Limb Rehabilitation Based on Back Propagation Neural Network and Genetic Algorithm (Year: 2022).*

\* cited by examiner

| Algorithm 1 Training process of Hypothesis Generation Net |
|---|

Input : Input of human writing sample, R

Output : A set of coordinate points, d

Initialisation : Writer Net and Estimator Net with random weights 1 : repeat
2 :    Step 1 :
3 :    Input R to Writer Net to produce a set of coordinates d
4 :    Step 2 :
5 :    Virtual robot writes calligraphy according to d in the simulation environment
6 :    Step 3 :
7 :    for i = 0 to k1 do
8 :        Update Estimator Net to approximate the network to the writing result by the virtual robot
9 :    end for
10 :    Step 4 :
11 :    for i = 0 to k2 do
12 :        Update Writer Net so that output of Estimator Net approximates R
13 :    end for
14 : Until stop button is pressed

SELF-LEARNING INTELLIGENT DRIVING DEVICE

BACKGROUND OF THE INVENTION

Field of the Invention

The present invention relates to an intelligent driving device, in particular to a self-learning intelligent driving device.

Description of the Related Art

In recent years, in order to further improve the production efficiency of industry and commerce, people have invested a lot of efforts and resources in modeling the cognition of the human brain to provide an artificial intelligence driving device.

The hypothesis generation models used in driving devices are mostly based on probability. However, in fact, the calculation of the human brain is based on neurons. Therefore, there is still plenty of room for improvement of the general artificial intelligence driving devices.

To solve the above-mentioned problems, there is an urgent need for a self-learning intelligent driving device in the field.

SUMMARY OF THE INVENTION

The main objective of the present invention is to provide an intelligent driving device that can imitate the (input, output) performance by an auxiliary AI module, and then use the auxiliary AI module to accelerate a training process of a main AI module, thereby possessing a self-learning capability.

To achieve the above objectives, a self-learning intelligent driving device is proposed, including:

a first neural network module for performing a corresponding action evaluation operation on an input image to generate at least one set of trajectory coordinates:

a switching unit, having a first port, a second port, and a third port, and being controlled by a switching signal, where the first port is used to receive the at least one set of trajectory coordinates, when the switching signal is in an active state, data received at the first port will be sent to the second port, and when the switching signal is in an inactive state, data received at the first port will be sent to the third port;

a second neural network module for performing a corresponding image evaluation operation on the at least one set of trajectory coordinates to generate at least one simulated trajectory image when the switching signal is in the active state; and a driving unit having a robotic arm for generating at least one corresponding motion trajectory according to the at least one set of trajectory coordinates when the switching signal is in the inactive state.

In one embodiment, the self-learning intelligent driving device further has a user operation interface, the user operation interface has a learning process activation icon for a user to press, and when the learning process activation icon is pressed, the user operation interface will cause the switching signal to be in the active state.

In an embodiment, a plurality of weighting coefficients of the second neural network module are derived by using plural data sets of (the trajectory coordinates, image of the motion trajectory) to perform a first deep learning training process.

In one embodiment, a plurality of weighting coefficients in the first neural network module are updated by a method including: connecting the first neural network module with the second neural network module and using plural data sets of (the input image, the simulated trajectory image) to perform a second deep learning training process, and only adjusting the weighting coefficients of the first neural network module but not adjusting the weighting coefficients of the second neural network module during the second deep learning training process.

In one embodiment, the input image is derived from a calligraphy copybook.

DETAILED DESCRIPTION OF THE PREFERRED EMBODIMENTS

Figure 1:
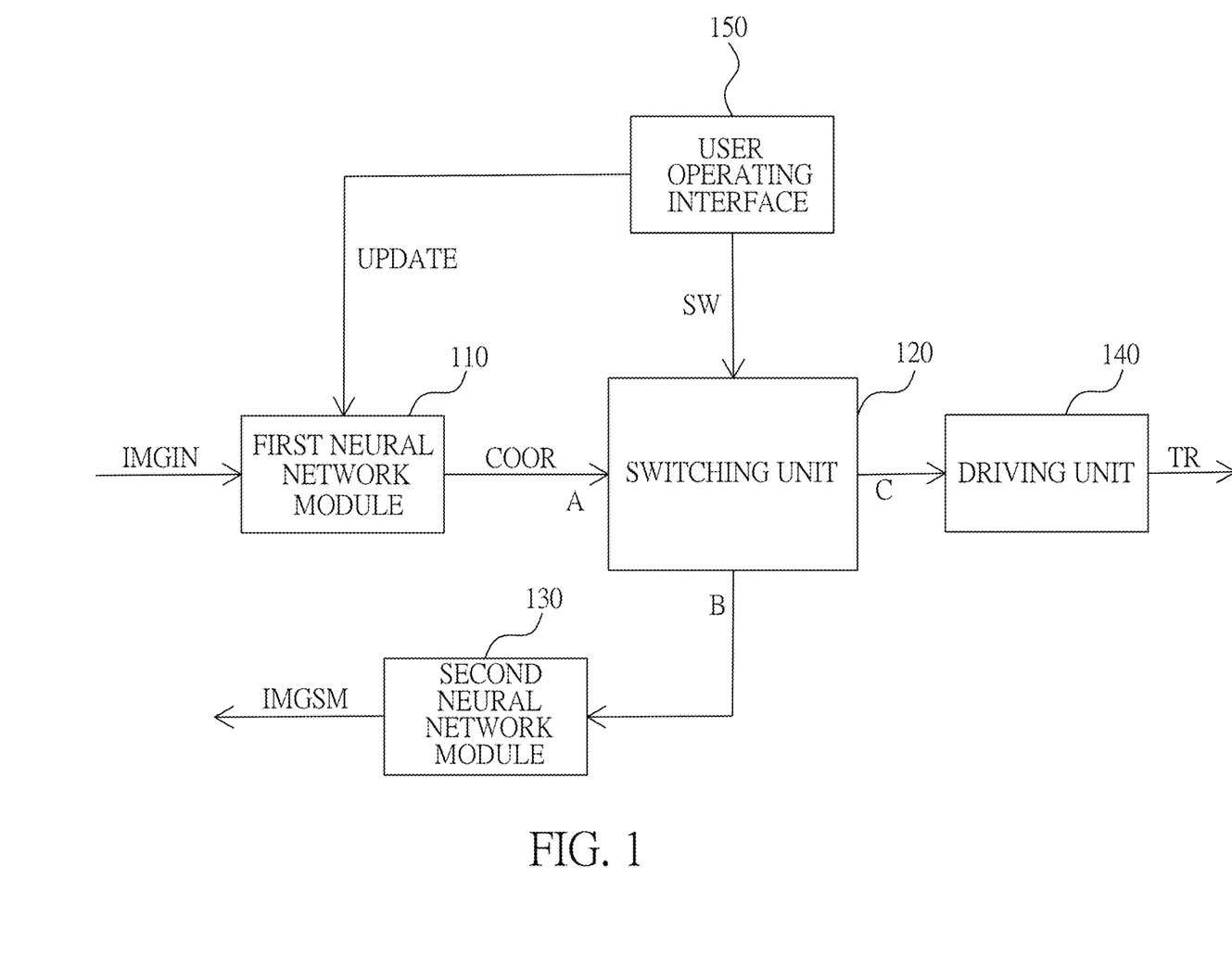
FIG. 1 illustrates a block diagram of a self-learning intelligent driving device according to one embodiment of the present invention.

Please refer to FIG. 1, which illustrates a block diagram of a self-learning intelligent driving device according to one embodiment of the present invention. As shown in FIG. 1, the self-learning intelligent driving device has a first neural network module 110, a switching unit 120, a second neural network module 130, a driving unit 140 and a user operation interface 150.

The first neural network module 110 is used to perform a corresponding action evaluation operation on an input image IMGIN to generate at least one set of trajectory coordinates COOR, where the input image IMGIN can be derived from a calligraphy copybook.

The switching unit 120 has a first port A, a second port B, and a third port C, and is controlled by a switching signal SW, where the first port A is used to receive the at least one set of trajectory coordinates COOR, when the switch signal SW is in the active state, data received at the first port A will be sent to the second port B, and when the switch signal SW is in the inactive state, data received at the first port A will be sent to the third port C.

The second neural network module 130 is used to perform a corresponding image evaluation operation on the at least one set of trajectory coordinates COOR to generate at least one simulated trajectory image IMGSM when the switching signal SW is in the active state, where plural weighting coefficients of the second neural network module 130 are derived by performing a first deep learning training process using plural data sets of (the trajectory coordinates, an image of motion trajectory) derived from plural input-output responses of the driving unit 140.

The driving unit 140 has a robotic arm for generating at least one corresponding motion trajectory TR according to the at least one set of trajectory coordinates COOR when the switching signal SW is in the inactive state.

The user operation interface 150 has a learning process activation icon (not shown in the figure) for a user to press, and when the learning process activation icon is pressed, the user operation interface 150 will output an update signal UPDATE to the first neural network module 110 and cause the switching signal SW to be in the active state to start an update process.

In the update process, a plurality of weighting coefficients in the first neural network module 110 are updated by a method, which includes: connecting the first neural network module 110 with the second neural network module 130 and using plural data sets of (the input image, the simulated trajectory image) to perform a second deep learning training process, and only adjusting the weighting coefficients of the first neural network module 110 but not adjusting the weighting coefficients of the second neural network module 130 during the second deep learning training process. In addition, during the second deep learning training process, the training process can be stopped when the root mean square of the difference of the pixel gray values of the input image and the simulated trajectory image is less than a threshold.

The principle of the present invention will be described in detail below with the input image derived from a calligraphy copybook.

The hypothesis generation model proposed by the present invention includes two parts: a hypothesis model and an evaluation model. When these two models interact, a system can use them to generate hypotheses based on historical experiences to solve complex tasks and verify the feasibility of the proposed hypothesis model accordingly. The following shows a virtual robot and its cognitive system. The virtual robot can learn how to write Chinese calligraphy in a simulated environment by including an image-to-action translation through a cognitive architecture to learn the pattern of Chinese characters, that is, the virtual robot uses human writing samples to perform a comprehending process and a practicing process to complete complex movements.

In recent years, artificial intelligence (AI) has dramatically affected human's life in many areas such as security, domotics, automatic system, face recognition, object recognition, market analysis, to name a few of them. Most of these research studies concern artificial narrow intelligence (ANI). However, devices, machines, and robots which need to adapt to a changeable environment require deep thinking and complex perception to handle uncertainties and make correct decisions. As a result, artificial general intelligence (AGI) is becoming an important topic for investigation by many researchers. AGI is a kind of strong AI which attempts to model human cognition and human mind. One of the key elements of AGI's kernel is the cognition system.

Cognitive psychology includes several parts, e.g., reasoning, memory, and perception. Among them, hypothesis generation model is an important research topic for reasoning as to how a human makes decisions by generating possible states based on historical experiences to solve a problem. In a hypothesis generation structure, the decision maker requires the actual state of the world in order to rectify the behavior if the current state is wrong. In fact, most research investigating hypothesis generation model is probability-based. That is, the posterior distribution is calculated to make new inferences based on historical experiences. However, computation of human brains is nevertheless neuron-based instead of calculating the probability. Therefore, the present invention proposes a neuron-based hypothesis generation model, called hypothesis generation net, to model human cognition, including how to make decisions and how to do actions.

In the last few years, deep neural networks have made a series of breakthroughs. They are widely utilized in images classification, objects detection, as well as voice synthesis or image translation. Autoencoder (AE) is a kind of unsupervised learning neural network which learns and extracts features automatically. The hidden layer of AE consists of two parts—an encoder and a decoder. The aim of the encoder is to compress an input into a set of latent vectors. Then, these latent vectors can be processed by the decoder to reconstruct the input. Traditional AE is usually utilized for dimensionality reduction or feature extraction. In recent years, AE has been widely applied in generating images, including converting picture colors, removing watermarks, denoising images, etc.

As a result, there have been various types of research on autoencoder, such as variational autoencoder, denoising autoencoder, sparse autoencoder, etc. Another related method in unsupervised learning is generative adversarial networks (GANs), which utilize a discriminator model to classify output images into 'real' or 'fake' and utilize a generator model to produce 'fake' images which the discriminator model cannot distinguish from 'real' images. The GANs model has inspired many subsequent works for image synthesis, such as DCGAN and Deepfake algorithm, which can swap one person's face with another in a video or an image. Motivated by AE and GAN, a neuron-based hypothesis generation model of the present invention is established. Through deep learning realization, the proposed hypothesis generation model has the ability to learn and generate hypotheses through practices using historical experiences, thereby addressing the problem of image to action translation.

To validate the feasibility of the proposed hypothesis generation model, the present invention shows a virtual robot with its cognition system that can learn how to write Chinese calligraphy in a simulation environment through a comprehending process and a practicing process with a human writing sample. Chinese calligraphy writing, which is regarded a difficult task requiring extremely complicated motions, focuses on changing the speed, press, strength, orientation, and angle of a writing brush to write aesthetic calligraphy. It is complicated for designers to analyze the strokes of characters in different styles. Therefore, profound skills are needed to write Chinese characters well. Pressing the brush heavily or lightly causes the stroke of the Chinese characters to become thick or thin, respectively. Moreover, the turning angle and timing for manipulating the brush are also important. Given the challenges, there have been researches focusing on the development of Chinese calligraphy-writing robots. To simplify the tasks required, most of image-based researches utilized 3-axis vector [x, y, z] to control the robot to write Chinese calligraphy because 6-axis [x, y, z, roll, pitch, yaw] motion planning for Chinese calligraphy writing is a complex task for robots. It is intuitive to extract the position component [x, y, z] from a Chinese calligraphy character by detecting the skeletonization and thickness of the calligraphy characters. However, the orientation and tilt of the writing brush are much more complicated to calculate because Chinese calligraphy characters can be written with many different motions. That is, different motions can achieve the same writing result. The relationship between motion and writing result is not a one-to-one, but a many-to-one mapping function. While the generation of position vector sequences for the writing brush is straightforward through machine vision operations, the combinations of orientation and tilt sequences, however, are extremely numerous for the writing brush. Therefore, it is difficult to generate coordinates of roll, pitch and yaw of the writing brush from a human writing sample by directly using computer vision methods. In light of the above difficulties, it is therefore the objectives of the present invention to apply the proposed neuron-based hypothesis generation model to a virtual robotic system through a simulation environment where the virtual robot with its cognition system can learn and figure out how to write Chinese characters well by repetitively practicing.

To build an artificial cognitive system to model the hypothesis generation process, every single neuron of deep neural networks is important. By connecting multiple neurons, the present invention can construct a system to simulate the structure of a human brain to fulfill the function of reasoning and judgement. Without hypothesis generation processes, the system is not able to understand the surroundings and learn by itself. Therefore, deep neural networks are utilized in the present invention to realize the hypothesis generation process to model the psychological learning process of human beings to accomplish different types of tasks.

In a hypothesis generation model, most investigations indicate that the hypotheses made by humans come close to the Bayesian model, where inference is resulted from hypothesis generation and evaluation and expressed as:

$$P(h|d) = \frac{P(d|h)P(h)}{\sum_{h' \in H} P(d|h')P(h')} \quad (1)$$

where H is a complete set of hypotheses, h, h'∈ H, d is the sensor input, P(h|d) is a posterior probability to hypothesis h, P(h) denotes its prior probability, and P(d|h) represents the likelihood of the sensory input data under hypothesis h. Because H is a complete set of hypotheses, it is impossible to generate the whole space of hypotheses in many cases. To solve the approximation of posterior probability with less biases coming from the incomplete hypotheses, Markov chain Monte Carlo (MCMC) method can help approximate the posterior probability by (2) as:

$$P_N(h|d) = \frac{1}{N}\sum_{n=1}^{N} f(h_n = h) \quad (2)$$

Where f(•) is 1 if the statement is true, otherwise is 0. $h_n$ is a random sample hypothesis from the Markov chain. If N goes to infinity, we obtain a non-bias approximation of the posterior probability.

However, the computing units in human brains are neurons. That is, the decision, memory, and perception come from a central nervous system. Even though much research supports that MCMC can also be explained with neuroscience as cortical circuits, the hypothesis generation from humans can be regarded as a complicated neural network. Actually, all of the hypotheses are from neural computing in human brains. It is therefore possible for the present invention to design deep neural networks to simulate the hypothesis generation process.

Figure 2:
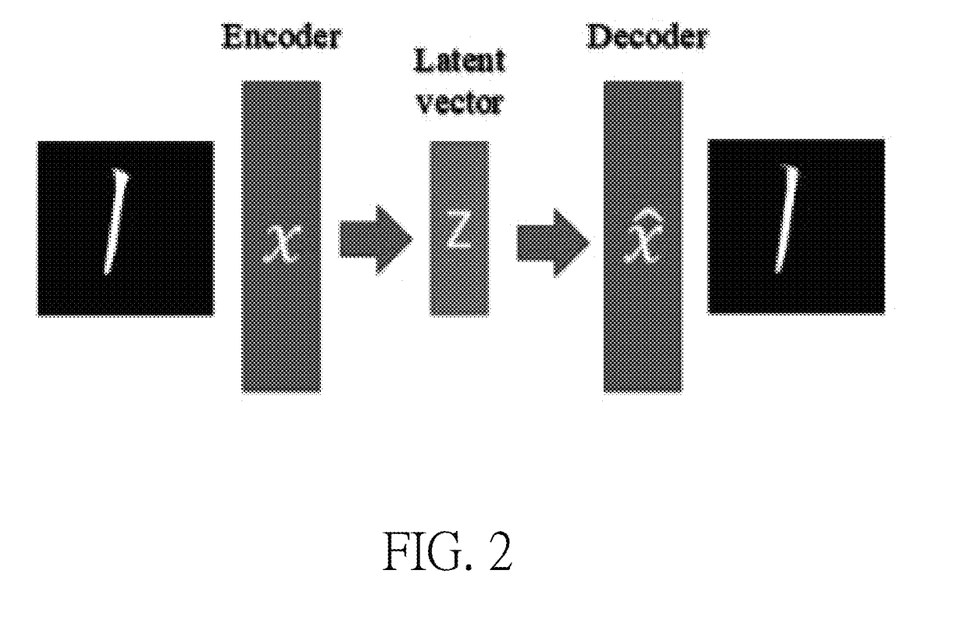
FIG. 2 illustrates a schematic diagram of an automatic encoder adopted by the present invention.

AE is a type of unsupervised learning, which was first introduced by Ballard. The method is utilized to compress an input into a latent vector via an encoder. The latent vector usually presents an important part of the data. After that, the decoder utilizes the latent vector to reconstruct the input data. Comparing the inputs with the outputs, we can learn the weights of the encoder and decoder according to the loss function. Please refer to FIG. 2, which shows the schematic diagram of the automatic encoder.

Goodfellow et al. introduced GANs, which are deep neural net architectures for training a generative model via an adversarial process. GANs consist of two nets, i.e., a generator net G and a discriminator net D. The generator G generates samples from a prior noise distribution and the discriminator D is trained to distinguish whether the samples come from the real data distribution or the generator's distribution. The generator is then trained to compete with the discriminator D by minimizing log(1−D(G(z))), so as to make the discriminator unable to distinguish whether the samples are real data or generator's data Hypothetical Generation Model The neuron-based hypothesis generation model of the present invention is implemented by a neural network, and the virtual robot of the present invention can learn how to write Chinese calligraphy through the hypothesis generation model, and the method is not to use a top-down strategy to learn Chinese calligraphy but use a bottom-up strategy to build a cognitive system of learning. Please refer to FIG. 3, which shows the architecture of the hypothesis generation model for the robot system proposed by the present invention. The model is composed of two parts: a hypothesis model and an evaluation model. The hypothesis model is based on past stored experiences to make assumptions to solve problems using DNN1; the function of the evaluation model is to judge the hypothesis. The virtual robot stores the observed results in DNN2 so that the virtual robot can recall the results and historical experiences in the future to help DNN1 generate a new hypothesis by judging the previous hypothesis from the DNN1.

Figure 3:
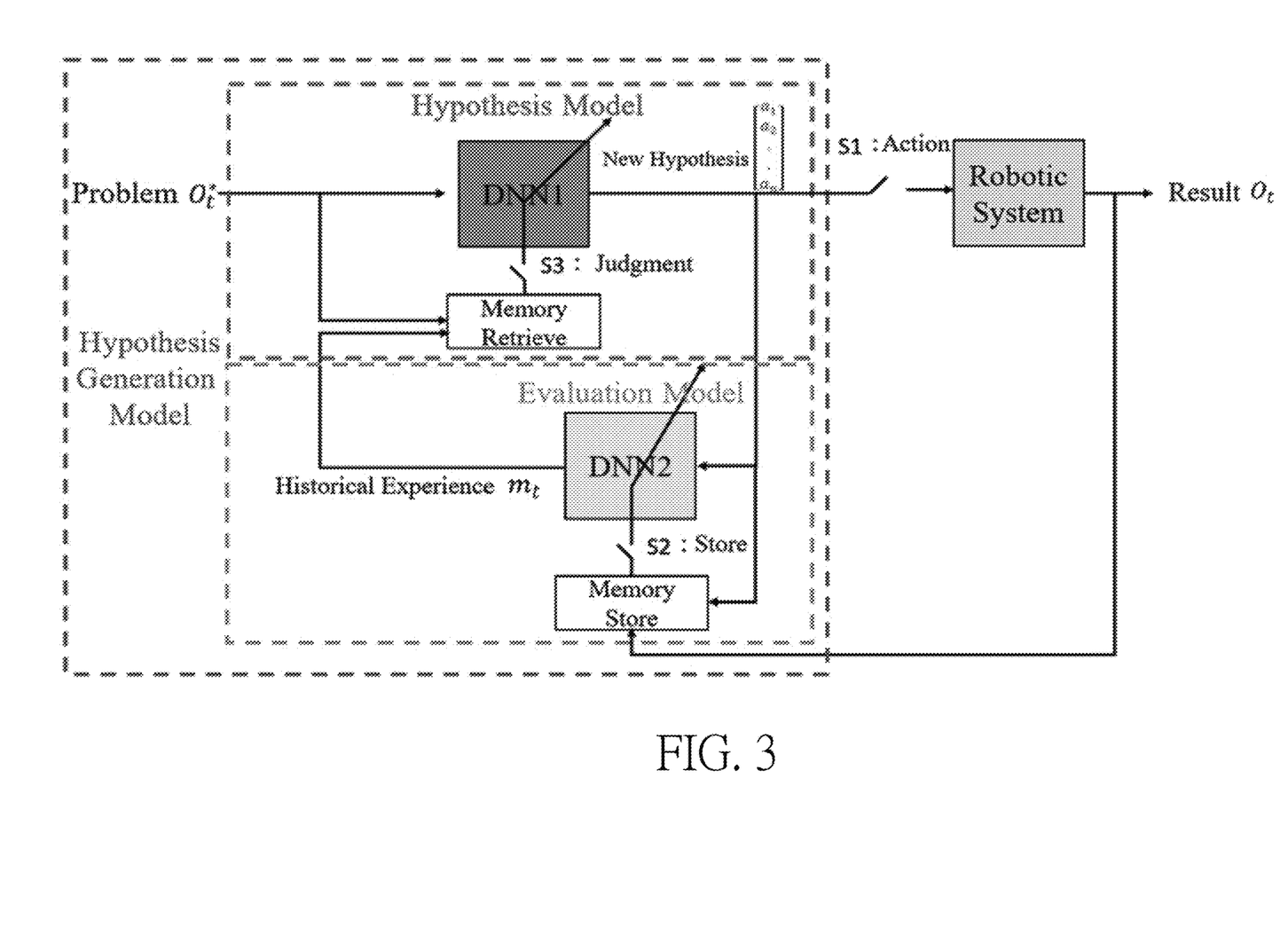
FIG. 3 illustrates an architecture of a hypothetical generation model for a robot system proposed by the present invention.

For instance, when the present invention needs the virtual robot to pick a bottle, the hypothesis model produces an action vector as the angles for controlling the motors. Then, we close switch s1 so that the virtual robot can execute the action vector which is received from DNN1. Then, the evaluation model stores the result and the hypothesis in DNN2 by closing switch s2.

If the observed vector $O_t$ is not "pick a bottle", the hypothesis model needs to make a new hypothesis according to historical experiences. To make a new hypothesis, the present invention connects DNN1 by closing switch s3. In addition, DNN2, which stores historical experiences, helps compute the gradient of the error with the vector $m_t$ and the expected observed vector $O_t^*$ to update only DNN1. This update law is similar to the generator's update of GANs, but this architecture represents a general form for various robotic systems. Through several iterations, the present invention stores the best hypothesis according to the optimization criterion $\min(\|O_t^* - m_t\|)$. Note that we do not need to know the relationship between the action vector and the task "pick the bottle" because the virtual robot will figure out and learn the concept by itself.

Virtual Robot Convolution System Control Based on Hypothetical Generation Model

Hypothesis Generation Model-Based Control for Virtual Robotic Calligraphy Writing System Chinese calligraphy-writing represents a big challenge for a robot if the coordinates are not prescheduled. Even with computer vision, it is still difficult to calculate 6-axis coordinates [x, y, z, roll, pitch, yaw] for the robot to write Chinese calligraphy. We can get the relationship between 2D coordinates [x, y] and the Chinese calligraphy image by image processing, but the other coordinates [z, roll, pitch, yaw] are still difficult to derive. It is therefore of significance for the present invention to implement the proposed hypothesis generation model, so that a virtual robot can comprehend and learn to figure out the method of writing Chinese calligraphy. To prevent the time-consuming process in learning how to write Chinese calligraphy in a real environment, the present invention utilizes a virtual robotic system. Please refer to FIG. 4a-4d, which illustrate schematic diagrams of a virtual robot of the present invention simulating a brush writing process.

Figure 4A:
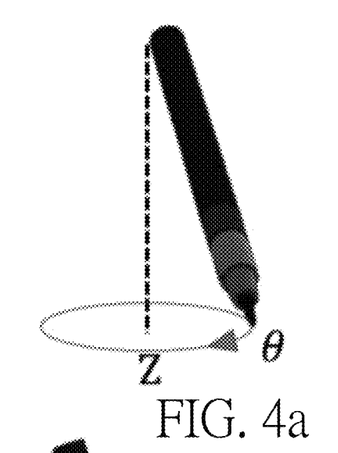
FIG. 4a-4d illustrate schematic diagrams of a virtual robot of the present invention simulating a brush writing process.
Figure 4B:
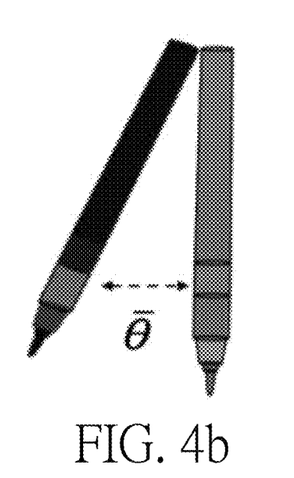
Figure 4C:
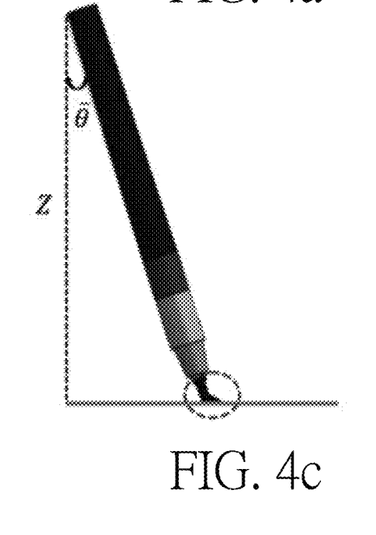
Figure 4D:
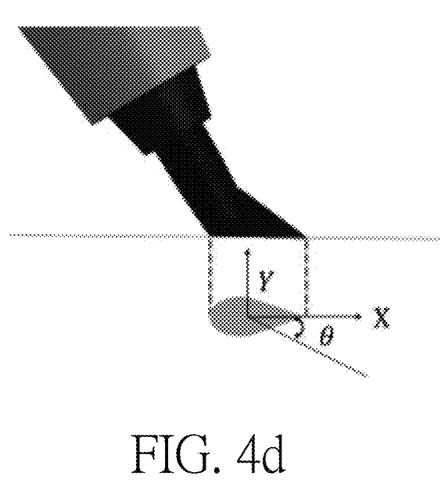

In addition, in this embodiment, the present invention uses a five-axis simplified form without a rotation axis, instead of using six-axis [x, y, z, roll, pitch, yaw] to describe Cartesian coordinates, the angle of rotation and the angle of inclination of the brush is because the brush rarely rotates when writing Chinese calligraphy. The vector [X, Y] represents Cartesian coordinates, and [Z] is the vertical axis coordinate to indicate the thickness and thickness of Chinese characters. Vector [θ,θ̄] controls the rotation and tilt of the brush, these two factors will profoundly affect the aesthetic effect of Chinese calligraphy. FIGS. 4a and 4b show schematic diagrams of the rotation θ and tilt θ̄ of the brush, respectively. FIGS. 4c and 4d respectively show a schematic diagram of the brush writing characters according to the coordinates [X,Y,Z,θ,θ̄] in the simulation environment.

Calligraphy Net Model

Figure 5:
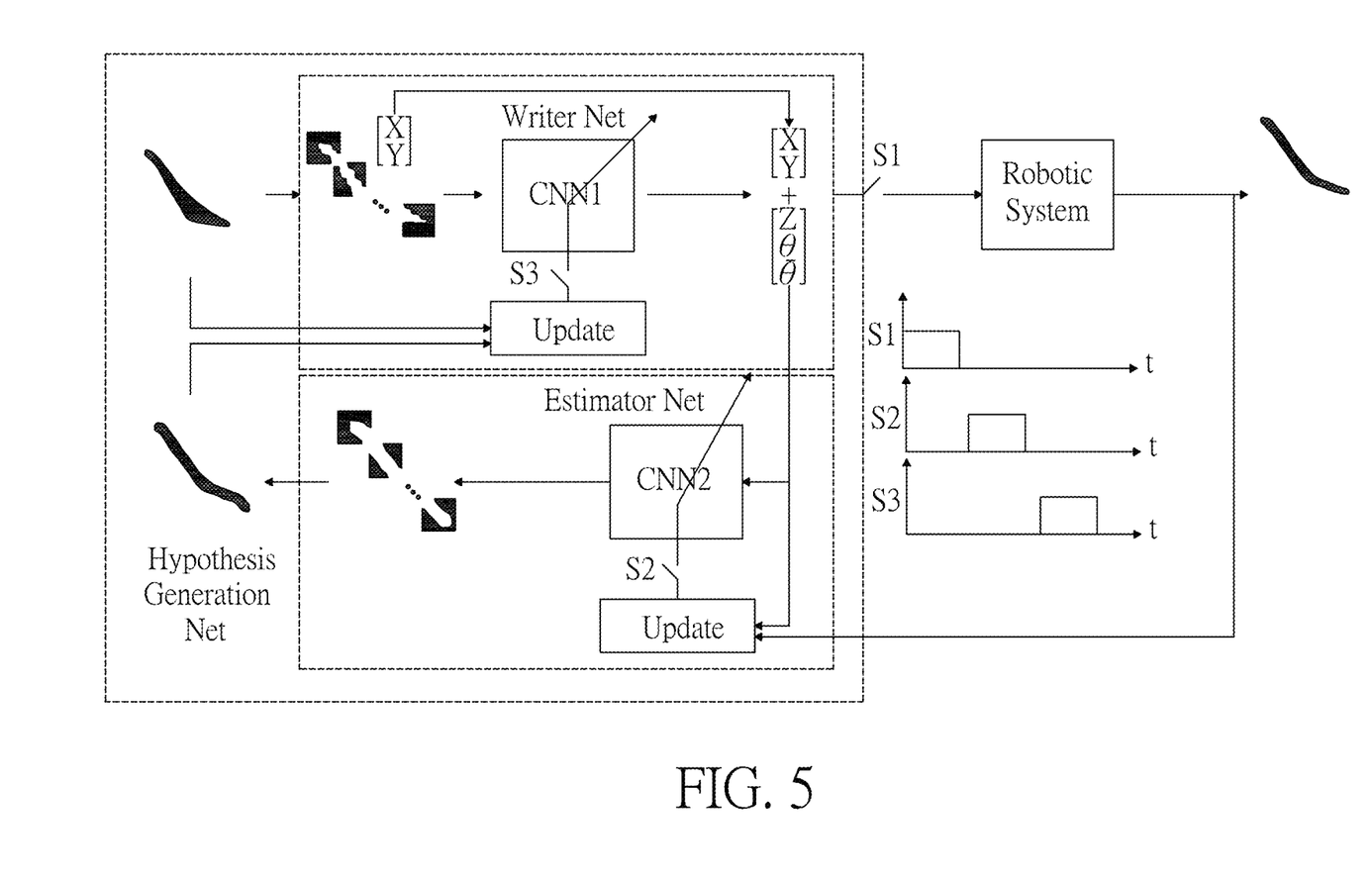
FIG. 5 illustrates a structure of a hypothetical generation model of the robotic calligraphy system proposed by the present invention.

The architecture of the hypothesis generation model for a robotic calligraphy-writing system is shown in FIG. 5. Firstly, the present invention utilizes the fast thinning algorithm to extract data from the strokes of Chinese characters from a human writing sample. Next, the present invention splits the original image into several region of interest (ROI) images in accordance with the trajectory of the stroke. The number of ROI images is chosen to be the number of skeleton points. Every ROI during the writing process corresponding to [X, Y] is given by coordinates of a stroke. On the other hand, everycoordinate corresponding to ROI image can be obtained by training the Writer Net. By using the coordinates [X, Y] and [Z,θ,θ̄], the writing results can be observed through the virtual robotic system. Then, the present invention trains Estimator Net by a simulative image written by the virtual robot to memorize and recognize the result from the virtual robotic system. Following that, the present invention connects the Writer Net and Estimator Net as hypothesis generation net and lock Estimator Net to train Writer Net to minimize the loss between the original image and the image memorized by the Estimator Net. The learning process continues by repetitively alternating between k1 iterations for optimizing Writer Net and k2 iterations for optimizing Estimator Net. Keeping optimizing this training pattern until the simulative image becomes very close to the original image indicates that the robotic system has the ability to do better actions. Through the interaction between Estimator Net and Writer Net, they simultaneously progress to accomplish the hypothesis generation process. Therefore, the present invention can obtain more accurate coordinates to write Chinese calligraphy. The loss functions of Writer Net and Estimator Net are respectively shown as:

$$loss_{\theta_E} = \sum_{i=0}^{l-1} \frac{1}{wh} \sum_{y=0}^{h-1} \sum_{x=0}^{w-1} \left( E(W(R(C(I)_{x,y}))) - S(W(R(C(I)_{x,y}))) \right)^2 \quad (3)$$

$$loss_{\theta_W} = \sum_{i=0}^{l-1} \frac{1}{wh} \sum_{y=0}^{h-1} \sum_{x=0}^{w-1} \left( E(W(R(C(I)_{x,y}))) - R(C(I)_{x,y}) \right)^2 \quad (4)$$

$$R(C(I)_{x,y}) = I_{C(I)_{k-10} \sim C(I)_{k+10}}, k = 1, 2, \ldots, 20 \quad (5)$$

where R is defined as ROI, and I is the length of the trajectory of the strokes. C(•) is defined as a function which sorts skeleton data according to the writing direction. The function W(•) is the proposed Writer Net that outputs a 3-dimension coordinates [Z,θ,θ̄] according to the ROI. Function S(•) is the virtual robotic system which outputs the writing result according to the coordinates [X,Y,Z,θ,θ̄]. E(•) is the proposed Estimator Net that outputs an image according to the coordinates [X,Y,Z,θ,θ̄]. The present invention utilizes mean square error (MSE) to measure the performance of the writing result. During the process of fitting Estimator Net E(•) to the virtual robotic system S(•), values of mean square error $loss_{\theta_E}$ of E(•) and S(•) can be obtained. It is to be noted that the writing result of the Estimator Net has to be as close to the human writing sample as possible. Thus, the Estimator Net and the Writer Net can be updated by minimizing the mean square error $loss_{\theta_{E^*}}$.

Figure 6:
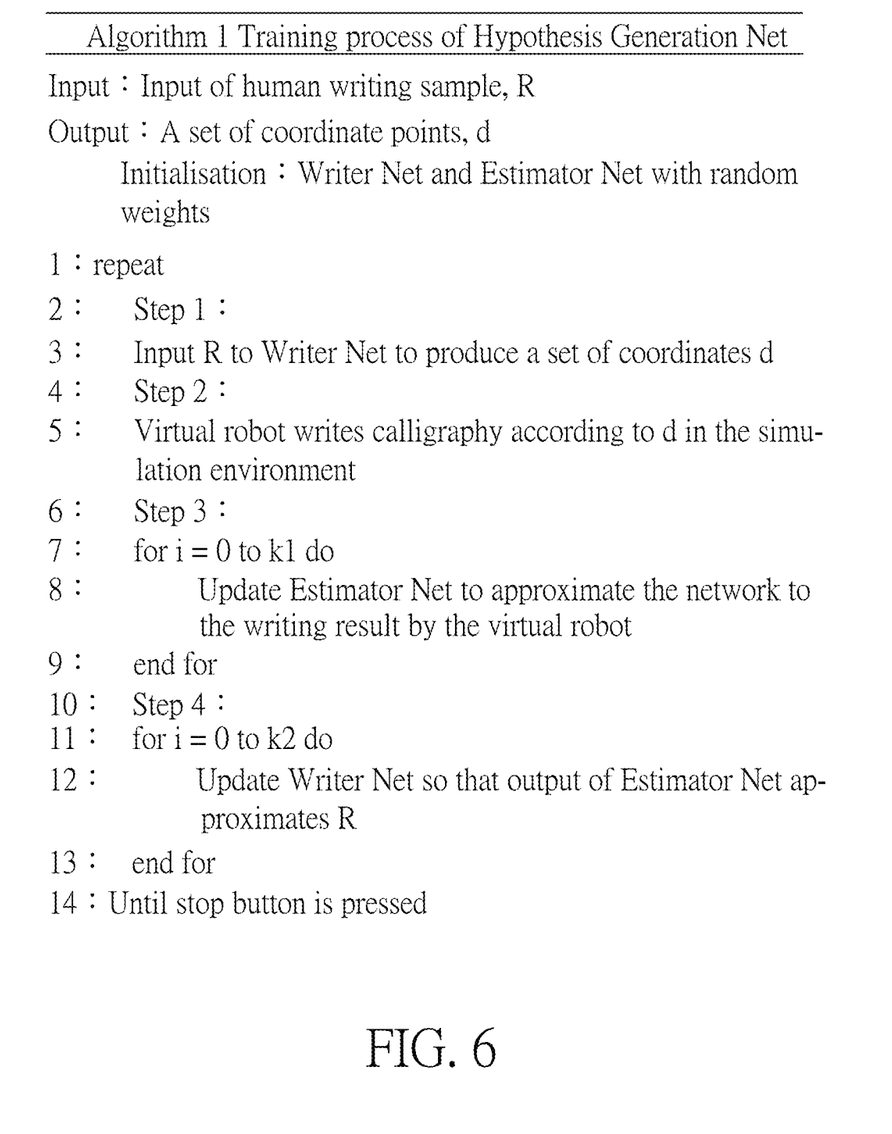
FIG. 6 illustrates an overall process of forming the hypothesis generation model of the present invention described by pseudo codes.

In order to help readers better understand the scheme, FIG. 6 illustrates an overall process of forming the hypothesis generation model of the present invention described by pseudo codes.

Writing Network and Estimator Network

The detailed architecture of the writing network of the present invention is shown in Table 1, which consists of eleven layers with weightings. Writing samples as input to the Writer Net are 20×20 grey scale images. All the convolutional layers have 3×3 filters and ReLu activation. Downsampling is utilized after the convolution layers by a max pooling layer with a stride of 2. When the previous layer is a max pooling layer, the number of the feature map is doubled to extract the feature from the higher dimensional data input. The dropout layer is set to fifty percent. LSTM and RNN in Table I are performed because our input writing samples are the ROI images of the stroke image. These ROI images are related to each other since the writing process is continuous.

TABLE I

| Layer | Type | Filter/stride | Output size |
|---|---|---|---|
| 1 | Image Input | | 20 × 20 × 1 |
| 2 | Convolution and ReLU | 3 × 3/1 | 20 × 20 × 128 |
| 3 | Convolution and ReLU | 3 × 3/1 | 20 × 20 × 128 |
| 4 | Convolution and ReLU | 3 × 3/1 | 20 × 20 × 128 |
| 5 | Max pooling | 2 × 2/2 | 10 × 10 × 128 |
| 6 | Convolution and ReLU | 3 × 3/1 | 10 × 10 × 128 |
| 7 | Convolution and ReLU | 3 × 3/1 | 10 × 10 × 256 |
| 8 | Convolution and ReLU | 3 × 3/1 | 20 × 20 × 256 |
| 9 | Max pooling | 2 × 2/2 | 5 × 5 × 256 |
| 10 | Convolution and ReLU | 3 × 3/1 | 5 × 5 × 512 |
| 11 | Convolution and ReLU | 3 × 3/1 | 5 × 5 × 512 |
| 12 | Convolution and ReLU | 3 × 3/1 | 5 × 5 × 512 |
| 13 | Dropout (50%) | | |
| 14 | LSTM | | 1 × 1 × 1024 |
| 15 | RNN | | 1 × 1 × 3 |

Figure 7A:
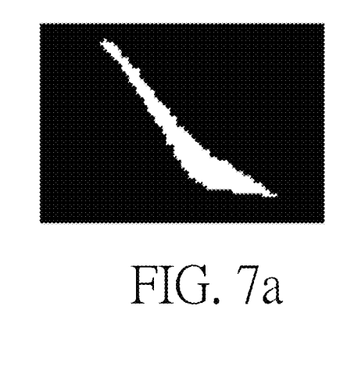
FIGS. 7a and 7b respectively show a right descending stroke and its trajectory.
Figure 7B:
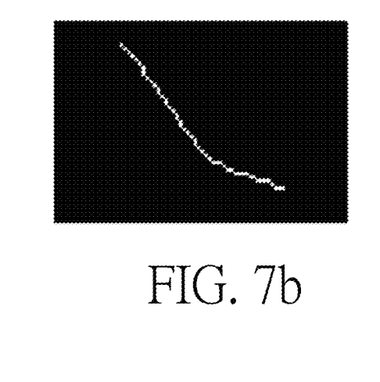
Figure 7C:
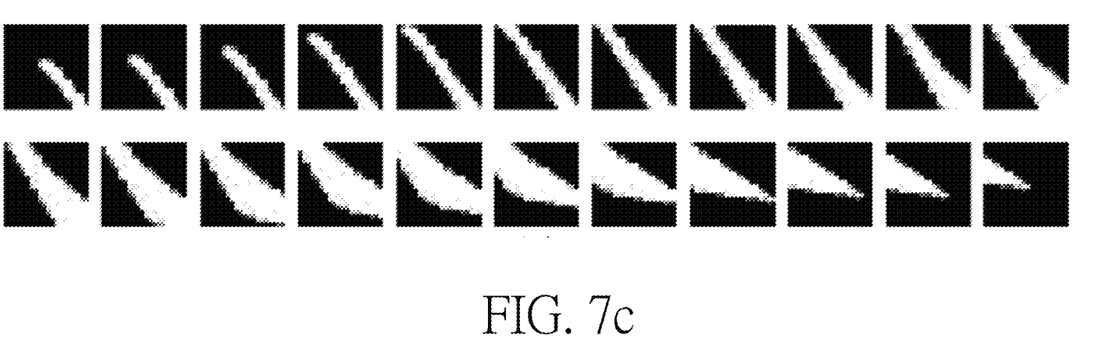
FIG. 7c shows a plurality of ROI images of the right descending stroke.

FIGS. 7a and 7b respectively show a right descending stroke and its trajectory, and FIG. 7c shows a plurality of ROT images of the right descending stroke. Furthermore, the coordinates [Z,θ,$\bar{\theta}$] corresponding to each image should be smooth and soft changing. The angles of a brush cannot change drastically if the states are close. Then, LSTM and RNN are utilized to suppress the variation of [Z,θ,$\bar{\theta}$].

The architecture of the proposed Estimator Net is shown in Table II, which consists of fourteen layers with weightings. The input vectors are 3-dimensional coordinates [Z,θ, $\bar{\theta}$]. The convolutional layers also have 3×3 filters and ReLu activation. The transpose convolutional layers are utilized to upscale with a stride of 2. The dropout layer is also set to fifty percent. Then two fully-connected layers are utilized to extract features into final output of 400 nodes to obtain 20×20 images by reshaping the output.

TABLE II

| Layer | Type | Filter/Stride | Output Size |
|---|---|---|---|
| 1 | Input | | 1 × 1 × 3 |
| 2 | Fully Connected | | 1 × 1 × 512 |
| 3 | LSTM | | 1 × 1 × 1024 |
| 4 | Fully Connected | | 1 × 1 × 12800 |
| 5 | Convolution and ReLU | 3 × 3/1 | 5 × 5 × 512 |
| 6 | Convolution and ReLU | 3 × 3/1 | 5 × 5 × 512 |
| 7 | Convolution and ReLU | 3 × 3/2 | 10 × 10 × 512 |
| 8 | Convolution and ReLU | 3 × 3/1 | 10 × 10 × 256 |
| 9 | Convolution and ReLU | 3 × 3/1 | 10 × 10 × 256 |
| 10 | Convolution and ReLU | 3 × 3/2 | 20 × 20 × 256 |
| 11 | Convolution and ReLU | 3 × 3/1 | 20 × 20 × 512 |
| 12 | Convolution and ReLU | 3 × 3/1 | 20 × 20 × 512 |
| 13 | Transpose Convolution and ReLU | 3 × 3/2 | 40 × 40 × 512 |
| 14 | Dropout (50%) | | |
| 15 | Fully Connected | | 1 × 1 × 1024 |
| 16 | Fully Connected | | 1 × 1 × 400 |

Simulation Results

Figure 8:
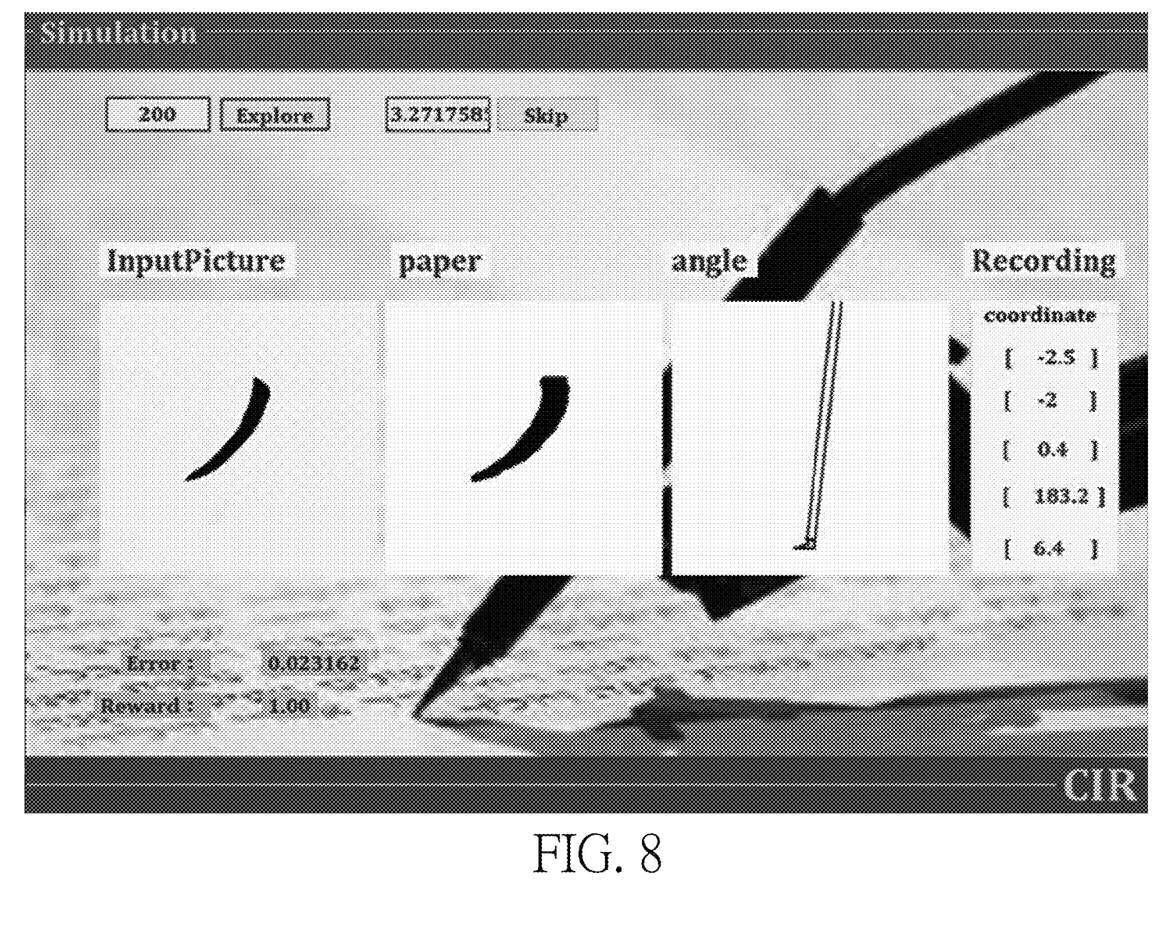
FIG. 8 illustrates a process of the virtual robot of the present invention simulating Chinese character writing.

The present invention conducts experiments on Intel Xeon CPU E3-1246 v6 of 3.70 GHz and NVIDIA GeForce GTX 1080 Ti with 32 GB memory. To avoid spending too much time training a physical robotic arm to write Chinese calligraphy, the present invention builds a robotic simulation environment shown in FIG. 3 for a virtual robot to simulate the process of Chinese calligraphy writing. As shown in FIG. 8, the left picture box "InputPicture" shows the stroke of Chinese character written by a human. The middle picture box "paper" reveals the writing result of the virtual Chinese calligraphy-writing robot. The picture box "angle" shows the current state of the brush. The current 5-axis coordinates are also shown on the right side of FIG. 8. Apart from the InputPicture, all the other boxes update the contents simultaneously when the simulation environment receives output of the Writer Net. The image of the Chinese calligraphy stroke captured by a webcam has a size of 200×200. We then convert the image into a grey-scale image as the input.

Figure 9A:
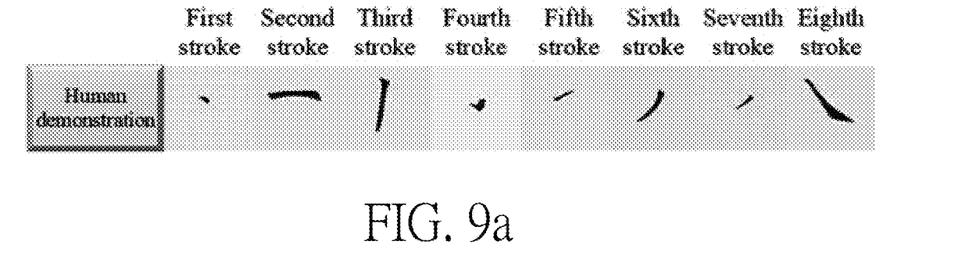
FIG. 9a illustrates eight ideal strokes of the Chinese character "永"
Figure 9B:
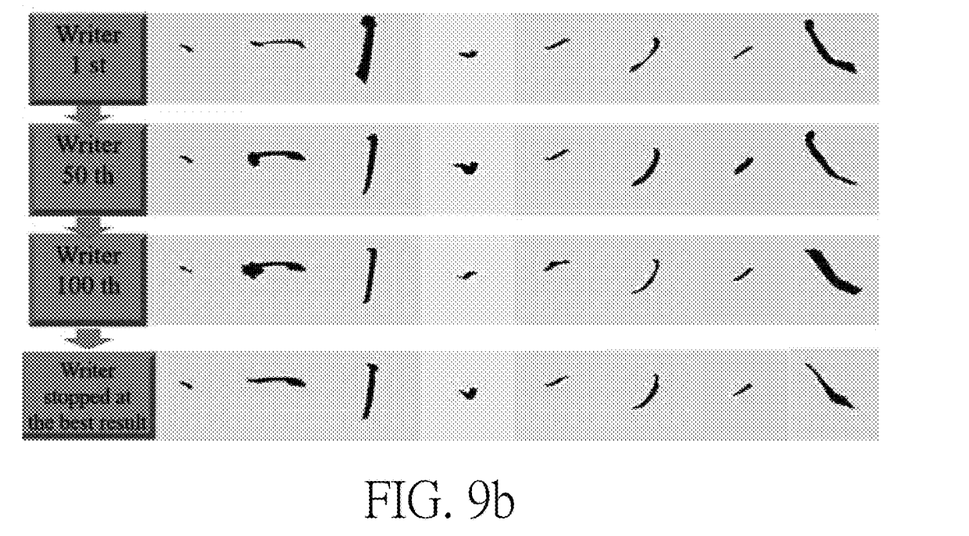
FIG. 9b-9c show a process of training the writing network and estimator network of the present invention to imitate the eight strokes.
Figure 9C:
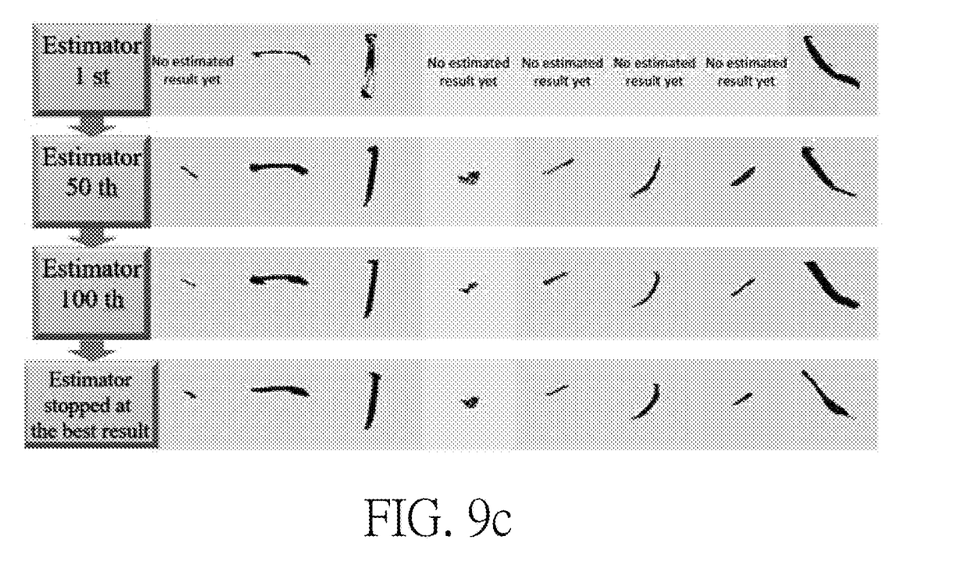

In addition, the experiment is conducted under Python 3.6 that utilizes Tensorflow backend with Keras library and NVIDIA CUDA 9.0 library for parallel computation. Mean square error (MSE) is utilized to measure the performance of the hypothesis generation net. We utilize root mean square prop (RMSProp) to be the optimizer. FIG. 9a shows the eight ideal Chinese strokes of Chinese character 'yong' (Q). FIGS. 9b and 9c show the training process of the eight strokes by the Writer Net and the Estimator Net, respectively. The images shown in FIG. 9b are drawn by the Writer Net which predicts the coordinates. Through the simulation system, the Writer Net emulates a similar image which the robotic arm could draw. FIG. 9c shows the images from the Estimator Net according to the coordinates provided from Writer Net. In the beginning, the Estimator Net generates images according to the coordinates far different from the Writer Net. Gradually, the results of the Estimator Net become more and more similar to the Chinese character written by the Writer Net. Therefore, the coordinates produced by the Writer Net become more and more similar to the ideal target, and this process simulates human's learning process. That is, human's learning process includes: first, a human generates a behavior based on a learning task; and second, the human uses the brain to memorize and analyze the result of the behavior, so that the human can do a better job next time in performing the same task with the help of the previous experience.

Figure 10A:
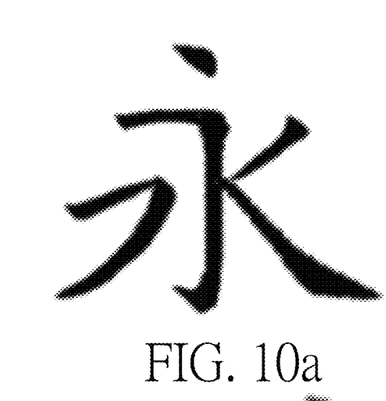
FIG. 10a shows a human-written Chinese character "永"
Figure 10B:
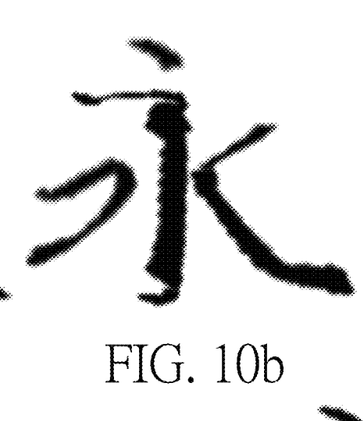
FIG. 10b shows a simulated writing result of the virtual robot of the present invention after the first iteration.
Figure 10C:
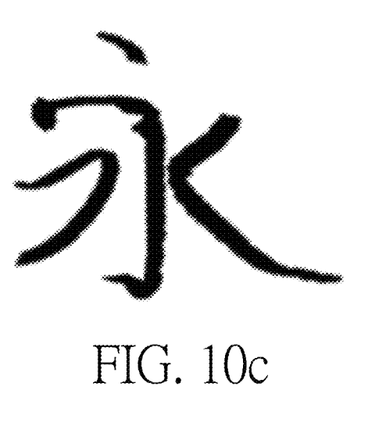
FIG. 10c shows a simulated writing result of the virtual robot of the present invention after the 50th iteration.
Figure 10D:
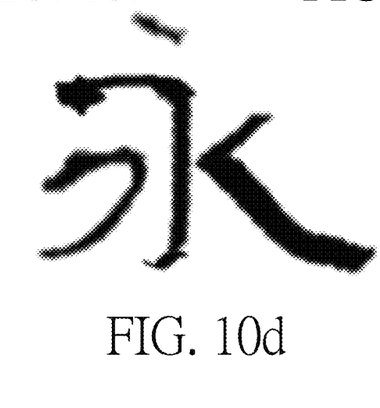
FIG. 10d shows a simulated writing result of the virtual robot of the present invention after the 100th iteration.
Figure 10E:
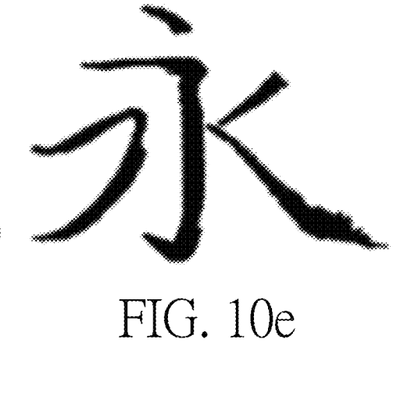
FIG. 10e shows the best simulated writing result of the virtual robot of the present invention.
Figure 11A:
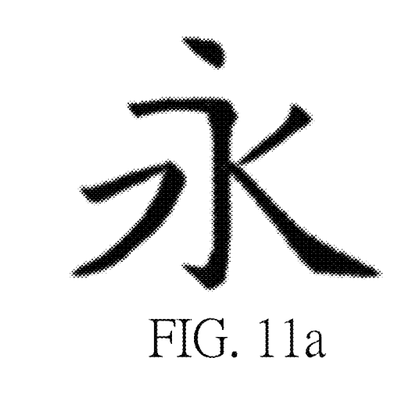
FIG. 11a-11d illustrate four Chinese characters "永", "寸", "大", "江" written by human.
Figure 11B:
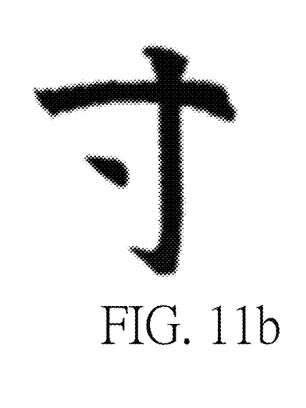
Figure 11C:
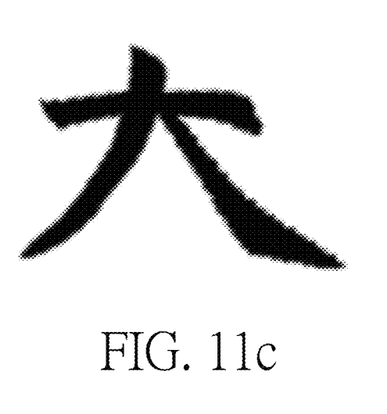
Figure 11D:
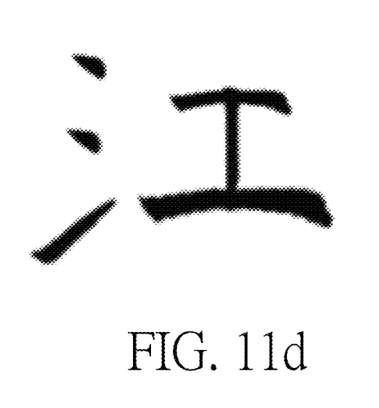
Figure 11E:
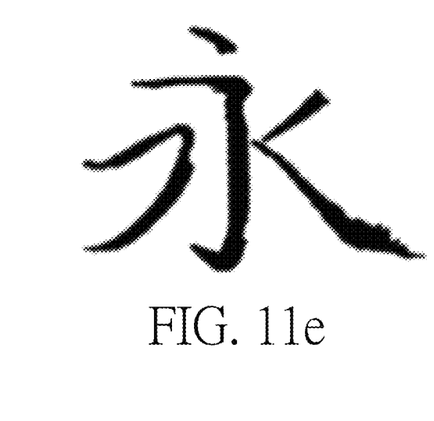
FIG. 11e-11h illustrate simulation results of four Chinese characters "永", "寸", "大", "江" written by the virtual robot of the present invention.
Figure 11F:
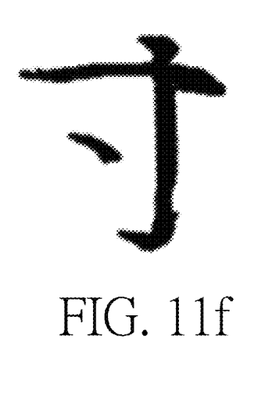
Figure 11G:
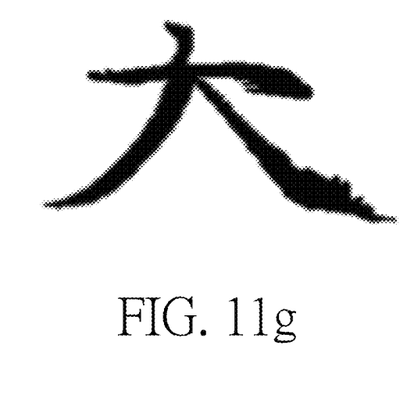
Figure 11H:
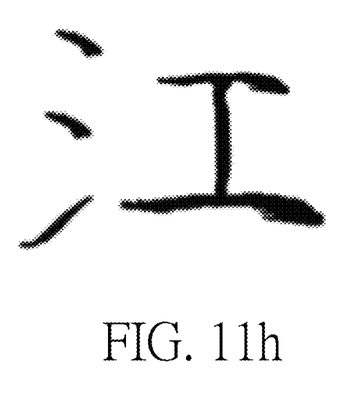

In addition, by combining some strokes, the present invention can form a complete Chinese character. FIG. 10a shows a human-written Chinese character "永", FIG. 10b shows a simulated writing result of the virtual robot of the present invention after the first iteration, FIG. 10c shows a simulated writing result of the virtual robot of the present invention after the 50th iteration, FIG. 10d shows a simulated writing result of the virtual robot of the present invention after the 100th iteration, and FIG. 10e shows the best simulated writing result of the virtual robot of the present invention. As shown in FIG. 10a-10e, the Chinese character "永" includes 8 strokes. FIG. 11a-11d illustrate four Chinese characters "永", "寸", "大", "江" written by human; and FIG. 11e-11h illustrate simulation results of four Chinese characters "永", "寸", "大", "江" written by the virtual robot of the present invention.

Thanks to the designs mentioned above, the present invention has the following advantages:

The intelligent driving device of the present invention can imitate the (input, output) performance by an auxiliary AI module, and then use the auxiliary AI module to accelerate a training process of a main AI module, thereby possessing a self-learning capability.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A self-learning intelligent driving device, including:
   a first neural network module for performing a corresponding action evaluation operation on an input image to generate at least one set of trajectory coordinates;
   a switching unit; having a first port, a second port, and a third port, and being controlled by a switching signal, where the first port is used to receive the at least one set of trajectory coordinates, when the switching signal is in an active state, data received at the first port will be sent to the second port, axed when the switching signal is in an inactive state, data received at the first port will be sent to the third port;
   a second neural network module for performing a corresponding image evaluation operation on the at least one set of trajectory coordinates to generate at least one simulated trajectory image when the switching signal is in the active state; and
   a driving unit having a robotic arm for generating at least one corresponding motion trajectory according to the at least one set of trajectory coordinates when the switching signal is in the inactive state.

2. The self-learning intelligent driving device as disclosed in claim 1, further including a user operation interface, wherein the user operation interface has a learning process activation icon for a user to press, and when the learning process activation icon is pressed, the user operation interface will cause the switching signal to be in the active state.

3. The self-learning intelligent driving device as disclosed in claim 1; wherein a plurality of weighting coefficients of the second neural network module are derived by using plural data sets of (the trajectory coordinates, an image of the motion trajectory) to perform a first deep learning training process.

4. The self-learning intelligent driving device as disclosed in claim 3, wherein a plurality of weighting coefficients in the first neural network module are updated by a method, which includes: connecting the first neural network module with the second neural network module and using plural data sets of (the input image, the simulated trajectory image) to perform a second deep learning training process, and only adjusting the weighting coefficients of the first neural network module but not adjusting the weighting coefficients of the second neural network module during the second deep learning training process.

5. The self-learning intelligent driving device as disclosed in claim 1, wherein the input image is derived from a calligraphy copybook.

* * * * *